US006637080B2

(12) United States Patent
Verret

(10) Patent No.: US 6,637,080 B2
(45) Date of Patent: Oct. 28, 2003

(54) REVERSIBLE FLEX HOLDER FOR FLEXIBLE FACE SIGN

(76) Inventor: Normand Verret, 355 Power Road, Local 2, Edmundston, NB (CA), E3V 4K1

( * ) Notice: Subject to any disclaimer, the term of this patent is extended or adjusted under 35 U.S.C. 154(b) by 0 days.

(21) Appl. No.: 10/152,823

(22) Filed: May 23, 2002

(65) Prior Publication Data

US 2003/0005559 A1 Jan. 9, 2003

(30) Foreign Application Priority Data

Jul. 9, 2001 (CA) ............................................. 2352712

(51) Int. Cl.[7] ......................... A44B 21/00; F16B 21/06; G09F 17/00

(52) U.S. Cl. ............................. 24/462; 24/460; 24/461; 24/716; 16/87.2; 40/603; 160/378; 403/326

(58) Field of Search .......................... 24/462, 460, 461, 24/716; 16/87.2; 40/603, 606, 607; 160/378; 403/326

(56) References Cited

U.S. PATENT DOCUMENTS 2,335,361 A 11/1943 Schiller ...................... 160/395
4,449,275 A * 5/1984 Nava ........................... 24/462
4,662,038 A * 5/1987 Walker ........................ 24/462
4,937,961 A * 7/1990 Gandy et al. ................. 40/603
4,955,928 A 9/1990 Tanner ........................ 40/603
5,033,216 A 7/1991 Gandy et al. ................. 40/603
5,255,459 A 10/1993 Verret ......................... 40/603
5,301,447 A * 4/1994 Lotter et al. .................. 40/603
5,398,388 A 3/1995 Coleman ...................... 24/581
5,467,546 A 11/1995 Kovalak, Jr. ................. 40/603
5,517,779 A 5/1996 Coleman ...................... 40/603
5,572,821 A 11/1996 Coleman ...................... 40/603
5,647,155 A 7/1997 Hillstrom ..................... 40/603
5,669,166 A 9/1997 Verret ......................... 40/603
5,678,338 A 10/1997 Coleman ...................... 40/603
5,791,034 A 8/1998 Verret ....................... 29/281.5
5,893,227 A 4/1999 Johansson et al. ............ 40/603
6,061,941 A 5/2000 Verret ......................... 40/603
6,070,351 A 6/2000 Verret ......................... 40/603
6,073,376 A 6/2000 Verret ......................... 40/603
6,309,134 B1 * 10/2001 Hann ......................... 403/326

OTHER PUBLICATIONS

Title: General Drawing—New Product, Publication Date: Jun. 18, 1988, Publisher: Enseignes Imperial Signs Ltd Edmundston, New Brunswick Canada, Author: Alain Morin.

* cited by examiner

*Primary Examiner*—Victor Sakran
(74) *Attorney, Agent, or Firm*—Mario Theriault

(57) ABSTRACT

The present invention is a reversible single-piece flex holder for retaining a flexible sign face to a sign frame. The flex holder has a latch block and a latch blade movable toward the latch block about a hinge, for clamping the margin of a sign face. A pair of pivot lips are provided on the outside of the flex holder for engagement into a slot in a sign frame. These pivot lips are symmetrical to each other relative to a clamping axis of the flex holder, such that the flex holder is interchangeably mountable to the margin of a flexible sign face. The flex holder also has a stopper lip extending from the latch block and a stopper bulge on the latch blade. The lip and the bulge interfere with each other when the latch blade is reopened to a certain extent to prevent over-stressing the hinge.

20 Claims, 2 Drawing Sheets

REVERSIBLE FLEX HOLDER FOR FLEXIBLE FACE SIGN

FIELD OF THE INVENTION

This invention pertains to flex holders for retaining a flexible sign face to a sign frame and more particularly, it pertains to a reversible single-piece flex holder for installation one way or the other on the margin of a flexible sign face.

BACKGROUND OF THE INVENTION

The flexible face sign of interest herein has its face material stretched across an opening in a sign frame and is anchored to the periphery of the sign's opening. Holding devices are attached at intervals along the flexible sign face and are generally made to engage into a slot along the sign frame to retain the face material to the sign casing. The holding devices and the slot are covered with a cap or molding that enhances the general appearance of the sign. These holding devices are referred to in the industry as flex holders.

Examples of flex holders of the prior art are disclosed in several U.S. patents granted to Normand Verret, the inventor of the present invention. These US patents are:

U.S. Pat. No. 5,255,459 issued on Oct. 26, 1993;

U.S. Pat. No. 5,669,166 issued on Sep. 23, 1997;

U.S. Pat. No. 5,791,034 issued on Aug. 11, 1998;

U.S. Pat. No. 6,061,941 issued on May. 16, 2000;

U.S. Pat. No. 6,070,351 issued on Jun. 6, 2000; and

U.S. Pat. No. 6,073,376 issued on Jun. 13, 2000.

Other flex holders of the prior art are disclosed in the following US patents:

U.S. Pat. No. 4,955,928 issued on Sep. 11, 1990 to James A. Tanner;

U.S. Pat. No. 5,033,216 issued on Jul. 23, 1991 to James Gandy et al.;

U.S. Pat. No. 5,398,388 issued on Mar. 21, 1995 to Kelly R. Coleman; and

U.S. Pat. No. 5,467,546 issued on Nov. 21, 1995 to Judson L. Kovalak, Jr.

The flex holder described in the U.S. Pat. No. 6,061,941 in particular, is made of aluminum and has a longitudinal tongue and groove arrangement which is pressed over the sign face to clamp and to grip the sign face material between the tongue and the groove. Several flex holders are installed along the edge of the flexible sign face, and are inserted into a serrated slot along the sign casing for adjustably stretching the face material over the sign's opening and for retaining the face material in a taut condition.

During the installation of the flexible sign face, each flex holder is clamped in a specific orientation to the edge of the flexible sign face and is rolled over the flexible sign face material in a determined direction. It is then inserted in the rolled up mode into the serrated slot of the sign frame. This rotation is effected to wrap the flexible sign face material around the flex holder half a turn such that a tension in the flexible sign face causes the flex holder to rotate back inside the slot and to latch into the serrations inside the slot.

It will be appreciated that the orientation of the flex holder is different whether it is installed on a top margin or on a bottom margin, or on a right side margin or on a left side margin. The rotation of the flex holder on the margin of the flexible sign face is also different on all sides of the sign frame.

For a newly hired worker or a newly appointed contractor, the proper orientation of the flex holder can be ambiguous. These flex holders are normally installed in the field on a partly deployed flexible sign face, while standing in ladders or in boom-mounted buckets where the work posture is not always ideal. Consequently, some of the flex holders are often installed the wrong way and must be removed and replaced before a sign can be commissioned. The re-opening of a flex holder tends to break its hinge and destroy it. These installation errors add substantial amounts to the labor and material costs of a sign.

Although one flex holder of the prior art has been selected as an example herein above, it is believed that none of the flex holders of the prior art can be used interchangeably in one orientation or the other along the edge of a flexible sign face. It is also believed that the prior art is short of suggestion with regard to making a flex holder reversible. As such, it is believed that there continues to be a need in the sign industry for a reversible flex holder which can be installed one way or the other without limitation as to which side thereof is adjacent the front surface of a flexible sign face.

SUMMARY OF THE INVENTION

In the present invention, however, there is provided a single-piece flex holder which has symmetrical pivot lips and symmetrical torque bulges on both sides thereof such that is can be mounted interchangeably one way or the other on the edge of a flexible sign face.

In a broad aspect of the present invention, there is provided, a flex holder for retaining a flexible sign face to a sign frame, comprising a single-piece elongated body having a latch block and a latch blade hinged to the latch block for clamping the margin of a flexible sign face. A pair of pivot lips are provided on the outside of the flex holder for engagement into a slot in a sign frame. These pivot lips are symmetrical to each other relative to a clamping axis defined by the latch block and the latch blade.

The flex holder according to the present invention is advantageous for being interchangeably mountable, relative to the clamping axis, to a margin of a flexible sign face.

In accordance with another feature of the present invention, there is provided a pair of torque bulges on the elongated body, for co-operating with the margin of a flexible sign face to apply a torque on the flex holder to promote the engagement of the pivot lip into a sign frame. The torque bulges are also symmetrical to each other relative to the clamping axis In accordance with yet another feature of the present invention, each of the latch block and the latch blade has a pair of latch teeth thereon. Each pair engages with the other to clamp the flex holder to the edge of the flexible sign face. The teeth in each pair are spaced apart along and perpendicularly from the clamping axis. The engagement of these two pairs of latch teeth has been found to be particularly efficient in securely retaining the flex holder to the edge of a flexible sign face longitudinally and transversely relative to this edge.

In yet another feature of the present invention, there is provided a stopper lip extending from the latch block and along the latch blade, and a stopper bulge on the latch blade. The lip and the bulge are positioned to interfere with each other when the latch blade is opened to a certain extent. The stopper lip and the stopper bulge prevent over-stressing the hinge during the reopening of the flex holder such that a maximum number of reuses of the flex holder is possible.

In a further feature of the present invention there is provided a flex holder having a plurality of engagement lips between one of the pivot lips and one of the torque bulges. The flex holder is thereby mountable in a plurality of different types of sign frames.

Other advantages and novel features of the present invention will become apparent from the following detailed description.

BRIEF DESCRIPTION OF THE DRAWINGS

The preferred embodiment of the invention will be further understood from the following description, with reference to the drawings in which.

DETAILED DESCRIPTION OF THE PREFERRED EMBODIMENTS

Figure 1:
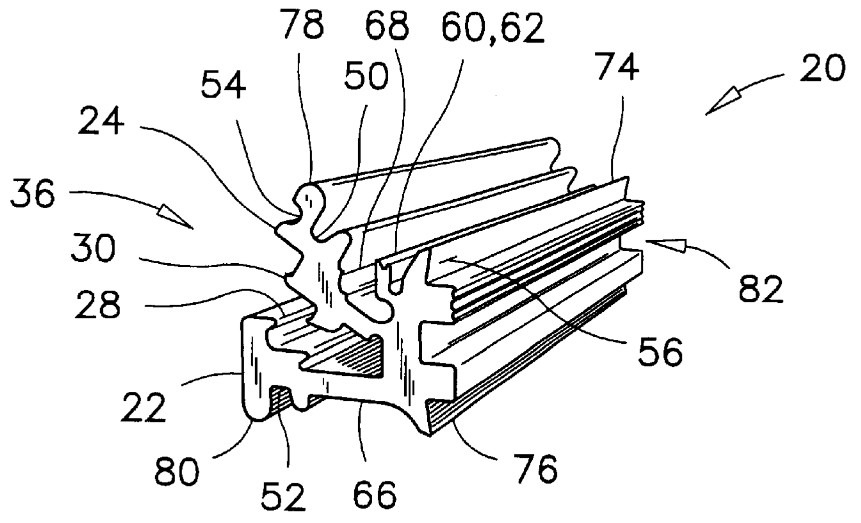
FIG. 1 is a perspective end and side view of the reversible flex holder according to the first preferred embodiment of the present invention.

In this detailed description, two embodiments are described. These two embodiments do not differ substantially from each other and are therefore considered to belong to the same inventive concept. Both embodiments are referred to hereinafter as the reversible flex holder when common features are described.

Referring to FIGS. 1–4, the reversible flex holder 20 has a single piece elongated extruded body with a length of about 2 inches (50 mm). The reversible flex holder is preferably made of aluminum, but can also be made of other malleable metals or plastics.

The reversible flex holder 20 has a generally rectangular cross-section, and comprises three main elements. It comprises a latch block 22, a latch blade 24 and a hinge 26 made of a thin malleable segment extending between the latch blade 24 and the latch block 22.

A first pair of latch teeth 28 on the latch block 22 coincides with a second pair of latch teeth 30 on the latch blade 24 when the latch blade 24 is bent about the hinge 26 toward the latch block 22. Each tooth in any one of each pair is spaced apart laterally and vertically from the other in the same pair relative to the reference transverse axis 32 and reference vertical axis 34 of the flex holder respectively. The transverse axis 32 is also referred to herein as the clamping axis 32 along which the latch blade 24 engages with the latch block 22.

Figure 3:
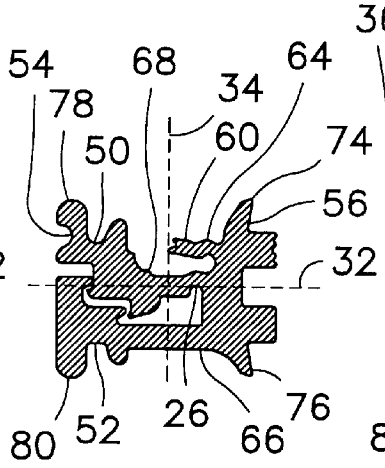
FIG. 3 is another end view thereof in a closed mode.

Each tooth 28, 30 has a hook formation on its tip to engage with the hook formation of the opposite tooth in the other pair. In the closed mode, as illustrated in FIG. 3, the first pair of teeth 28 engages with the second pair of teeth 30 with an interference fit. When the flex holder is clamped to the edge of the flexible sign face, it is thereby securely held to the edge.

Figure 2:
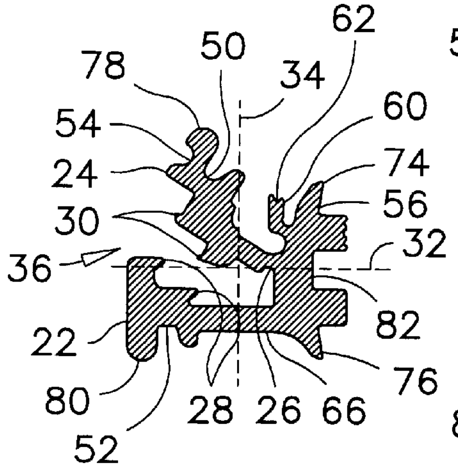
FIG. 2 is an end view thereof in an open mode.

In the open mode, as illustrated in FIGS. 1 and 2, a space 36 is defined between the latch blade 24 and the latch block 22. In use, this space 36 is guided over the edge of a flexible sign face and the latch blade 24 is closed over the latch block 22, enclosing and gripping the flexible face material between the two pairs of teeth 28, 30.

Figure 6:
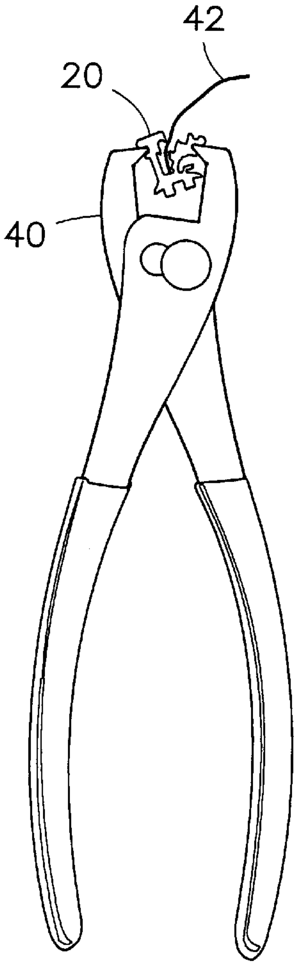
FIG. 6 illustrates a preferred method for clamping the reversible flex holder to the margin of a flexible sign face using pliers.
Figure 9:
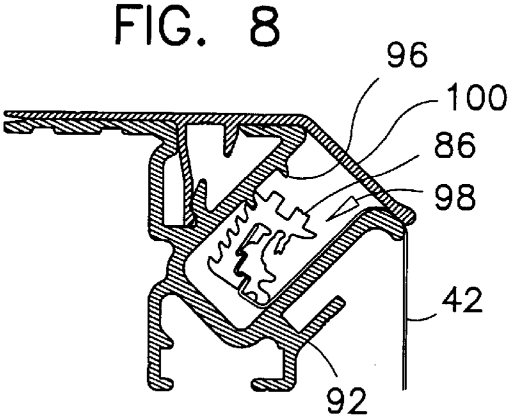
FIG. 9 shows the reversible flex holder according to the second preferred embodiment mounted in a first orientation in a first type of frame slot having protruding ledges therein.
Figure 10:
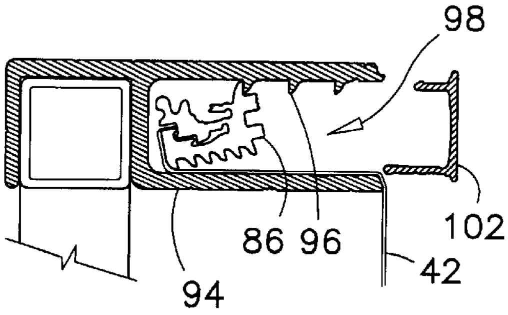
FIG. 10 shows the reversible flex holder according to the second preferred embodiment mounted in a second orientation in a second type of frame slot having protruding ledges therein.

The closing of the latch blade 24 over the latch block 22 is effected by pressing these two elements together and bending the hinge 26. This is preferably effected manually with pliers 40 as illustrated in FIG. 6. In this illustration, the label 42 represents the edge of the flexible sign face. The pressing of the latch blade 24 against the latch block 22 is facilitated by the provision of a first press notch 50 on the outside surface of the latch blade 24 relative to the axis 32, and a second press notch 52 on the outside surface of the latch block 22.

It has been found that the presence of the two pairs of engaging teeth 28, 30 is effective in retaining the flex holder to the edge of a flexible sign face against transverse slippage. Furthermore, it has been found that the presence of these two pairs of teeth prevents any longitudinal slippage of the flex holder along the edge of a flexible sign face, when the sign face is pulled longitudinally on its frame to remove any wrinkle therein for example.

The reversible flex holder 20 can be re-opened for the purpose of replacing a sign face for example, by pressing the latch blade 24 away from its engagement with the latch block 22, using the pliers 40. For this purpose, the pliers 40 are engaged into a first opening notch 54 on the tip of the latch blade 24 and a second opening notch 56 on the base of the latch block 22. When the flex holder is closed, the first and second opening notches 54, 56 align with each other and with a plane which is substantially parallel to the clamping axis 32 of the reversible flex holder 20.

A stopper lip 60 is affixed to the latch base 22 adjacent the hinge 26, on the outside of the latch blade 24 relative to the clamping axis 32. This stopper lip 60 has a V-shaped notch 62 along its tip. This lip 60 is retained to the base of the latch block 22 by a bendable segment 64 which also constitutes a hinge.

The stopper lip 60 on a new flex holder is aligned generally along the vertical axis 34 for ease of extruding the flex holder. During the installation of the flex holder 20 on the edge of a flexible sign face 42, the stopper lip 60 is preferably bent toward the latch blade 24, to align substantially parallel to the clamping axis 32. This is effected by prying the lip down with the pliers 40 engaged in the V-shaped notch 62 and against the transverse wall 66 of the latch block 22.

Figure 4:
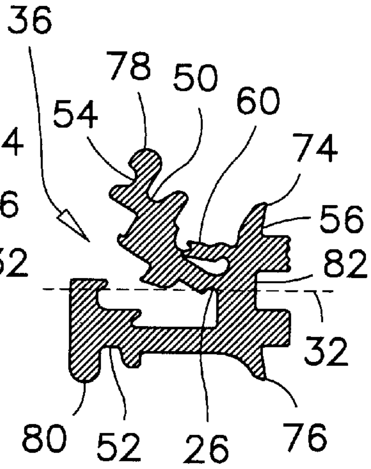
FIG. 4 is yet another end view thereof in a re-opened mode.

A stopper bulge 68 along the outside surface of the latch blade 24 is positioned at a radius from the hinge 26 which corresponds to the position of the V-shaped notch 62 when the lip is aligned with the clamping axis 32. Therefore, the stopper bulge 68 engages with the stopper lip 60 when the latch blade 24 is re-opened, as illustrated in FIG. 4, to prevent the bending of the hinge 26 beyond a yield point of the material with which the flex holder is made. It will be appreciated that the relative positions of the stopper lip 60 and the stopper bulge 68 can be defined to limit the stress in different materials with which the reversible flex holder is made, or to allow a certain number of re-openings of the flex holder before failure of the hinge 26 occurs. It has been found that a reversible flex holder 20 made of aluminum 6063-T5 can be closed and re-opened about 5 or 8 times before the hinge 26 fails.

It is to be noted also, that in the event of a failure of the hinge 26, the stopper lip 60 and the side wall 66 of the latch block 22 define a cavity into which the latch blade 24 is retained, such that the flex holder can still be re-closed and re-used reliably, when a new flex holder is not available of course.

Referring now simultaneously to FIGS. 1–4 and FIGS. 7 and 8, the reversible flex holder 20 is mountable in a slot 70 along a sign frame. The slot 70 is wider than the thickness of the flex holder 20 such that the flex holder can rotate a few degrees inside the slot. The flex holder 20 is mounted in the slot with the space 36 oriented toward the bottom of the slot 70. The flexible sign face 42 is wrapped half a turn around the flex holder 20 to cause the flex holder to rotate back inside the slot and to grab into the serrations 72 inside the slot 70 when tension is applied to the flexible sign face.

For convenience of this description, the side of the reversible flex holder 20 closest to the hinge 26 is referred to herein as the hinge side, and the side of the flex holder closest to the opening 36 is referred to as the opening side. The hinge and opening sides of the flex holder are the right and left sides respectively in FIGS. 2–4. Similarly, the upper side of the flex holder as illustrated, is referred to as the blade side and the lower side is referred to as the base side.

The reversible flex holder 20 has a pair of opposite pivot lips 74, 76, on the hinge side thereof. These pivot lips 74, 76 are shaped to engage with the serrations 72 in a sign frame for retaining the flex holder 20 at various positions inside the slot 70, for applying more or less tension in the flexible sign face 42.

The reversible flex holder 20 also has a pair of opposite torque bulges 78, 80 on the opening side thereof. In use, the flexible sign face 42 is wrapped over one of these torque bulges 78, 80 to apply a torque on the flex holder and cause one of the pivot lips 74, 76 to engage into one of the serrations 72.

Figure 7:
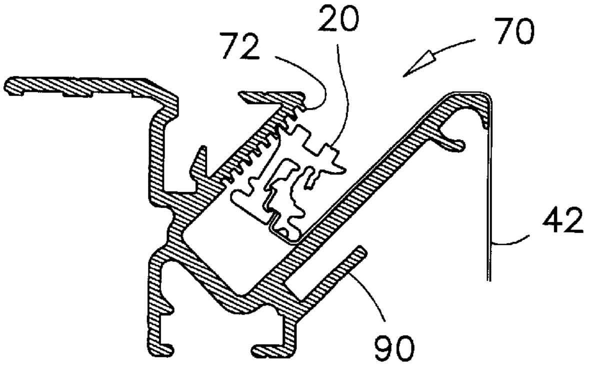
FIG. 7 is a cross-section view of the reversible flex holder according to the first preferred embodiment mounted in a first orientation inside a serrated slot along a sign frame.
Figure 8:
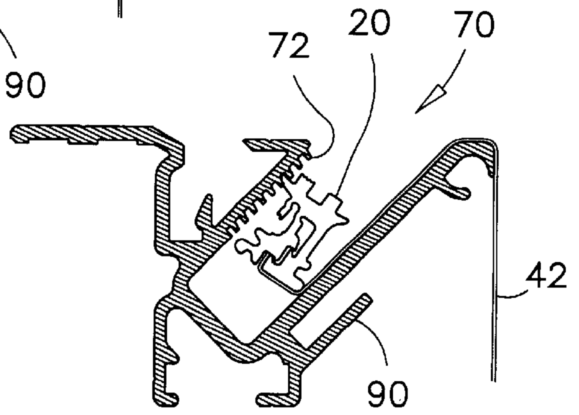
FIG. 8 shows the reversible flex holder in a second orientation inside the serrated slot.

As it can be appreciated, the torque bulges 78, 80 and the pivot lips 74, 76 are substantially symmetrical relative to the clamping axis 32 of the flex holder 20, when the flex holder is closed on the edge of a flexible sign face 42. The reversible flex holder 20 has a generally rectangular cross-section in which the corners are defined by the pivot lips 74, 76 and the torque bulges 78, 80. The flex holder 20 can thereby be installed one way or the other inside the frame slot 70 as shown in FIGS. 7 and 8, with the same engagement efficiency. This is particularly advantageous for allowing an installer to clamp the flex holder in the most convenient way along the flexible sign face without having to ponder at which way the flexible face should be wrapped around the flex holder.

The flex holder 20 also has a tool engagement groove 82 on the hinge side thereof for receiving the blade of a screwdriver for example for pushing the flex holder into a sign frame or for releasing it from the sign frame.

Figure 5:
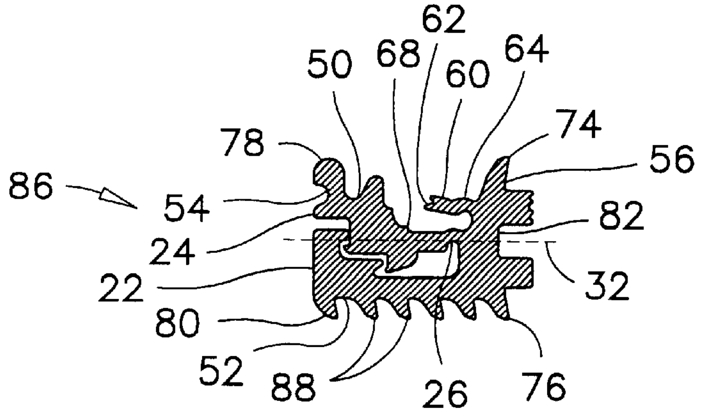
FIG. 5 is an end view of a reversible flex holder according to the second preferred embodiment of the present invention in which one side has a plurality of engagement lips thereon.

Referring now to FIG. 5, the reversible flex holder 86 according to the second preferred embodiment is illustrated therein. In this embodiment, the flex holder 86 has a series of engagement lips 88 on the base side thereof between one of the pivot lips 76 and one of the torque bulges 80. This flex holder 86 can be used one way or another in a sign frame 90 having the serrations 72 or one way or another in a sign frame 92, 94 having one or more spaced ledges 96. The series of engagement lips 88 provides a fine adjustment means, to precisely position the flex holder 86 along the slot 98 of the sign frame.

The slots 70 or 98 are covered by a molding 100 or 102 after the installation of the flexible sign face 42 to the sign frame, for aesthetical purposes and to protect the flex holder from the weather.

As to other manner of usage and operation of the instant invention, the same should be apparent from the above description and accompanying drawings, and accordingly further discussion relative to the manner of usage and operation would be considered repetitious and is not provided.

While the above description provides a full and complete disclosure of the preferred embodiment of this invention, various modifications, alternate constructions and equivalent may be employed without departing from the true spirit and scope of the invention. Such changes might involve alternate components, structural arrangements, operable features or the like. Therefore, the above description and accompanying illustrations should not be construed as limiting the scope of the invention which is defined by the appended claims.

I claim:

1. A flex holder for retaining a flexible sign face to a sign frame, comprising:

a single-piece elongated body having two sides;

latch means between said two sides for attachment thereof onto a margin of a flexible sign face; said latch means defining a clamping axis thereof;

a pair of pivot lips on said elongated body, having means for engagement to a sign frame; said pivot lips being symmetrical to each other relative to said clamping axis; and a pair of torque bulges on said elongated body, each of said torque bulges having means to cooperate with a margin of a flexible sign face to apply a torque thereon: said torque bulges being symmetrical to each other relative to said clamping axis and spaced apart from said pivot lips along said clamping axis;

such that an interchangeable positioning thereof on a margin of a flexible sign face relative to said clamping axis is available.

2. A flex holder for retaining a flexible sign face to a sign frame, comprising:

an elongated body having a generally rectangular cross-section, a clamping axis, a latch block and a latch blade extending there along, and a hinge joining said latch blade to said latch block;

latch means on said latch block and said latch blade for selectively clamping a margin of a flexible sign face therein;

a pair of pivot lips on said elongated body, having means for engagement into a sign frame; said pivot lips being symmetrical to each other relative to said clamping axis; and a pair of torque bulges on said elongated body, having means to cooperate with a margin of a flexible sign face to apply a torque thereon; said torque bulges being symmetrical to each other relative to said clamping axis;

said pivot lips and said torque bulges defining four corners of said rectangular cross-section;

such that an interchangeable positioning thereof on a margin of a flexible sign face is available.

3. The flex holder as claimed in claim 2, wherein said latch means comprises two pairs of latch teeth engaging each other.

4. The flex holder as claimed in claim 3, wherein said latch teeth in each of said pairs of latch teeth are spaced apart along and perpendicularly from said clamping axis.

5. The flex holder as claimed in claim 2, further comprising a stopper lip having means to restrict a bending of said latch blade away from said latch block.

6. The flex holder as claimed in claim 5, wherein said means to restrict a bending of said latch blade comprises a stopper bulge on said latch blade interfering with said stopper lip.

7. The flex holder as claimed in claim 5, wherein said stopper lip has a V-shaped notch on a tip thereof.

8. The flex holder as claimed in claim 7, wherein said stopper lip comprises a bendable segment extending from said latch block.

9. The flex holder as claimed in claim 2, wherein a material of construction thereof is aluminum 6063-T5.

10. The flex holder as claimed in claim 2, further having grooves therein, and said grooves having means for retaining pliers during a clamping thereof on a margin of a flexible sign face.

11. The flex holder as claimed in claim 2, also having a plurality of engagement lips between one of said pivot lips and one of said torque bulges.

12. A flex holder for retaining a flexible sign face to a sign frame, comprising:

an elongated body having a generally rectangular cross-section, a clamping axis, a latch block and a latch blade extending there along, and a hinge joining said latch blade to said latch block;

latch means on said latch block and said latch blade for selectively clamping a margin of a flexible sign face therein;

a pair of pivot lips on said elongated body, having means for engagement to a sign frame; said pivot lips being symmetrical to each other relative to said clamping axis;

a pair of torque bulges on said elongated body, having means to cooperate with a margin of a flexible sign face to apply a torque thereon; said torque bulges being symmetrical to each other relative to said clamping axis;

said pivot lips and said torque bulges defining four corners of said rectangular cross-section; and a plurality of engagement lips between one of said pivot lips and one of said torque bulges;

such that an interchangeable positioning thereof on a margin of a flexible sign face and a mounting thereof in different sign frames are available.

13. The flex holder as claimed in claim 12, wherein said latch means comprises two pairs of latch teeth engaging each other.

14. The flex holder as claimed in claim 13, wherein said latch teeth in each of said pairs of latch teeth are spaced apart along and perpendicular from said clamping axis.

15. The flex holder as claimed in claim 12, further comprising a stopper lip having means to restrict a bending of said latch blade away from said latch block.

16. The flex holder as claimed in claim 15, wherein said means to restrict a bending of said latch blade comprises a stopper bulge on said latch blade interfering with said stopper lip.

17. The flex holder as claimed in claim 15, wherein said stopper lip has a V-shaped notch on a tip thereof.

18. The flex holder as claimed in claim 15, wherein said stopper lip comprises a bendable segment extending from said latch block.

19. The flex holder as claimed in claim 12, wherein a material of construction thereof is aluminum 6063-T5.

20. The flex holder as claimed in claim 12, further having grooves therein, and said grooves having means for retaining pliers during a clamping thereof on a margin of a flexible sign face.

* * * * *